Aug. 13, 1935.     W. F. HEINEMAN     2,010,953
WELDING APPARATUS
Filed April 30, 1934
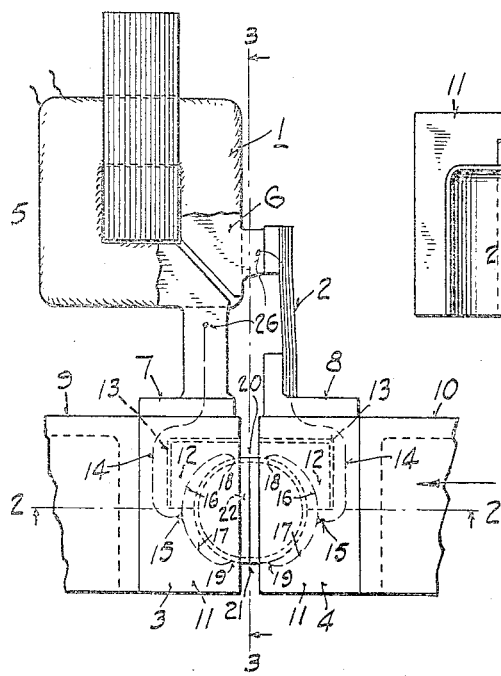
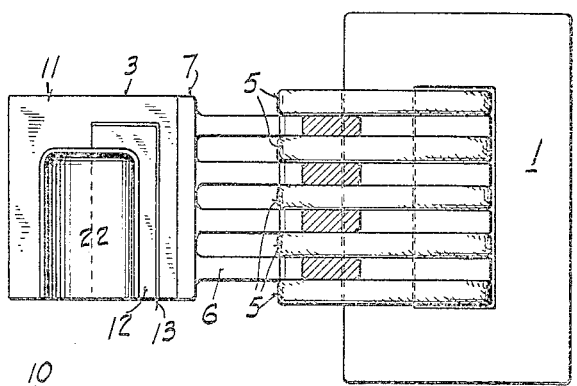
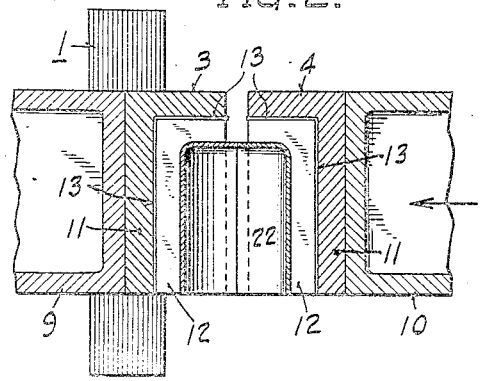
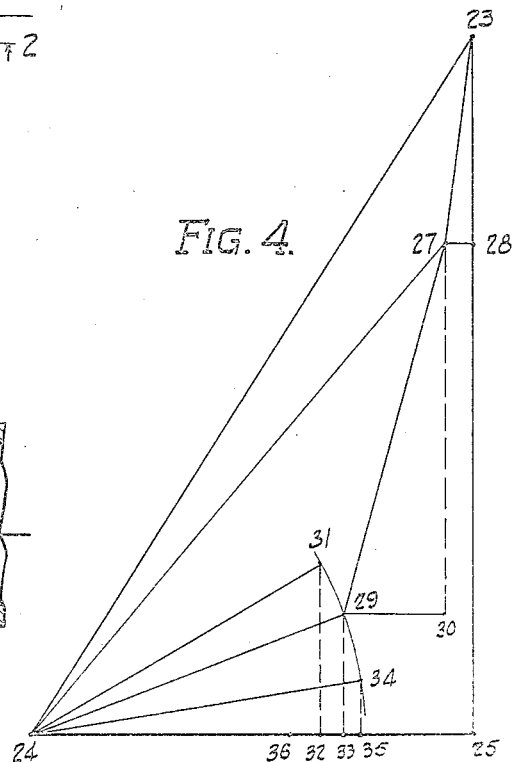
INVENTOR.
Warren F. Heineman
BY
ATTORNEY.

Patented Aug. 13, 1935

2,010,953

UNITED STATES PATENT OFFICE 2,010,953

WELDING APPARATUS

Warren F. Heineman, Shorewood, Wis., assignor to A. O. Smith Corporation, Milwaukee, Wis., a corporation of New York Application April 30, 1934, Serial No. 723,023

5 Claims. (Cl. 219—4)

The invention provides a simple and effective means to secure a proper distribution of welding current to the parts of work pieces to be joined by resistance or flash resistance welding. The accompanying drawing illustrates an embodiment of the invention.

Figure 1 is a top plan view of the current supply portion of a resistance welding machine.

Fig. 2 is a vertical sectional view taken on line 2—2 of Fig. 1.

Fig. 3 is a sectional view taken on line 3—3 of Fig. 1.

Fig. 4 is a voltage vector diagram illustrative of representative conditions for a system such as shown in the drawings.

Referring to Fig. 1, an electric welding current supply system for resistance or flash resistance welding is shown in which the principal parts are a transformer 1, a flexible lead 2, a stationary electrode 3, and an electrode 4, movable with respect to electrode 3.

The transformer 1 comprises a set of primary coils 5 and a copper secondary casting 6. One terminal 7 of the secondary 6 is shown connected to electrode 3, and the other terminal connected to electrode 4 through flexible lead 2 and terminal block 8.

The electrodes 3 and 4 are supported by attachment to brackets 9 and 10, respectively. The electrode faces are shown with recesses formed therein to receive two parts of a hollow cup-shaped object which are to be joined by the welding together of the edges shown arranged in abutting relation. Each electrode is shown as divided into a main block 11 and an insert block 12. Insulation 13 partially separates blocks 11 and 12 electrically. Where no insulation is shown between blocks 11 and 12, the joint is tight in order that the current may pass freely therebetween.

The effect of the insulation is to cause the current flowing through the electrodes to follow in general the paths represented by the dotted lines 14 to the points 15 and from there the two paths 16 and 17 to the positions 18 and 19 adjacent, respectively, to the seam 20 nearest the transformer and seam 21 farthest from the transformer.

It will be noted that the current flowing through path 17 surrounds the magnetic flux which may traverse the article and the hollow space 22 of the article to be welded, and that the current flowing through path 16 does not surround this flux. In the case of alternating current such as is here supplied by the transformer, a counterelectro-motive force will be induced by such flux and impede the current flow through path 17, but will not impede that through path 16.

Figure 4 is an illustrative vector diagram of voltages from point to point in an electrical supply system similar to that here shown in the drawing and is useful in describing the effect upon the current distribution produced by the modification of the electrodes by means of insulation 13. The values are taken for a period in the heating cycle in the simultaneous production of resistance welds at seams 20 and 21.

In Fig. 4, line 23—24 represents vectorially the voltage induced in the secondary of transformer 1 and is taken as approximately equal to the open circuit secondary voltage. The two components of the voltage 23—24 are respectively 23—25 which is the reactive or magnetic loss in voltage and 24—25 which is the total resistive voltage drop.

The voltage across points 26 of the secondary casting is vectorially illustrated by line 24—27. Line 23—27 represents the drop in voltage through the transformer of which 23—28 is the reactive loss due to magnetic leakage and 27—28 is the resistive voltage loss in said transformer.

The voltage across points 15 of the electrodes is vectorially represented by line 24—29. Line 27—29 represents the voltage loss through the leads, secondary blocks and electrodes from the points 26 up to the points 15. Lines 27—30 and 29—30 represent, respectively, the reactive and resistive voltage losses in this part of the circuit.

For simplicity of analysis it has been assumed that the current flowing through the respective seams 20 and 21 has been adjusted to approximate equality. In this case 24—31 being of the same voltage magnitude as 24—29 across points 15 represents the voltage drop through current path 17 which is farthest from the transformer. This path has greater reactive voltage drop 31—32 than that of the average path between points 15 which is shown as 29—33. Likewise, path 16 whose voltage 24—34 is of the same magnitude as 24—29 has less reactive voltage loss 34—35 than that of the average path, or 29—33.

In this diagram, Fig. 4, it is now seen that the resistive voltage drop in path 17 between points 15 of the electrodes is 24—32, and that of path 16 is 24—35. If 36—32 is the voltage drop through the electrodes from points 15 to points 19 of path 17 farthest from the transformer, then 24—36 is the resistive voltage drop through the seam 21 being heated. This must also be the resistive voltage drop for seam 20 in the path 16 nearest the transformer if this seam is like seam 21, since the current has been assumed as the same.

It is then apparent that the condition for such equality of current values between seams 20 and 21 is that the resistive drop in path 16 between the points 15 and 18 be 36—35. By extending the insulation 13 forward, path 16 may be lengthened and path 17 shortened, thereby adjusting the corresponding resistive drops toward the relationships of Fig. 4 and correspondingly improving the current distribution between the parts of the welding seam.

The above welding electrode arrangement is usable in welding machines of the kind described for use in both electric resistance and electric flash resistance welding.

Those skilled in the art may make various modifications without departing from the invention.

What I claim is:

1. In an electric resistance welding machine an electric supply system comprising a source of current, a pair of electrodes attached to the current source and arranged to receive and weld together parts of an article through extended areas of contact, said electrodes having inserts of insulation arranged to lengthen the path through which the current must flow to reach those portions of the welding area lying closest to said current source attachment to said electrodes.

2. In a welding machine of the class described for simultaneously welding an extended seam, welding electrodes subdivided to modify their resistance to the passage of current to portions of the seam to proportionately distribute the flow of welding current to different parts of said seam.

3. In a machine of the class described, electrodes to weld a hollow article along seams on either side of the opening of said article and insulation inserted into said electrode to increase the resistance to the flow of current to one of said seams to secure uniform current distribution between said seams.

4. In a welding machine of the class described, a current supply system comprisng a transformer, welding electrodes connected to said transformer and arranged to receive and weld hollow articles along seams one of which is substantially separated from said transformer connections by the space within said article, and insulation inserted in said electrodes to increase the electrode resistance to the passage of current to those parts of the seam that are not separated from said connection by said space to increase the proportionate current to the portion of said seam which is so separated.

5. In a machine of the class described, electrodes arranged to receive and supply current to parts to be simultaneously welded together throughout extended areas, said electrodes being constructed with elongated current paths to those portions of the areas to be welded lying close to the point of reception of said current to prevent the passage of current directly to said area portions and to secure uniform current flow to the several parts of said extended areas.

WARREN F. HEINEMAN.